June 7, 1955   G. MARVIN   2,709,829
STABILIZED CASTER
Filed March 26, 1954   2 Sheets-Sheet 1
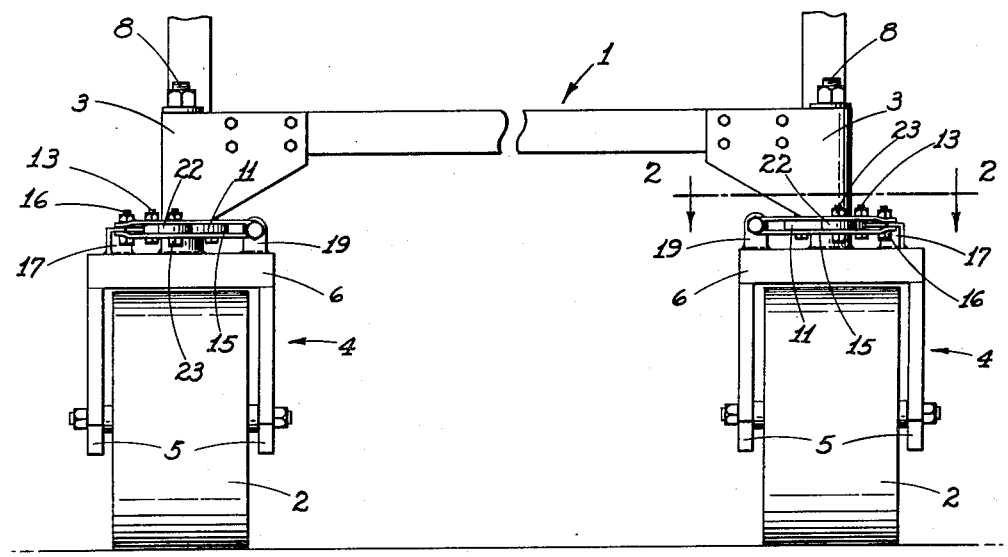
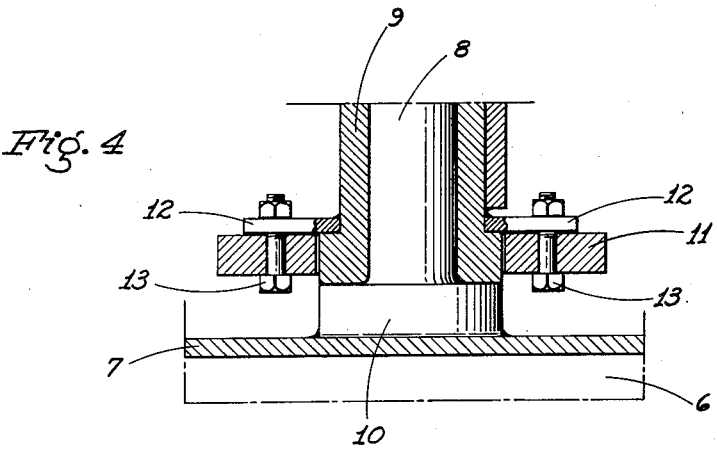
INVENTOR
George Marvin
BY Webster & Webster
ATTORNEYS June 7, 1955  G. MARVIN  2,709,829
STABILIZED CASTER Filed March 26, 1954  2 Sheets-Sheet 2

INVENTOR
George Marvin
BY Webster & Webster
ATTORNEYS

United States Patent Office 2,709,829
Patented June 7, 1955

2,709,829

STABILIZED CASTER

George Marvin, Woodland, Calif., assignor to Marvin Landplane Company, Woodland, Calif., a partnership Application March 26, 1954, Serial No. 418,951

6 Claims. (Cl. 16—35)

The present invention is directed to, and it is a major object to provide, a novel stabilizer unit adapted for use in connection with caster wheels on agricultural implements which are tractor pulled over the ground; the function of the device being to normally but releasably lock the caster wheels in a straight-ahead or dead-forward running position when the implement is moving forwardly, yet to automatically release the wheels—for caster movement—when the implement is making a turn so that the wheels do not then drag laterally.

Another important object of the instant invention is to provide a stabilizer unit which is especially designed—but not limited—for use in connection with one or more of the caster wheels, particularly those on the rear, of that type of implement known as a finisher leveler, as shown—for example—in United States Letters Patent No. 2,124,625. In such an adaptation the stabilizer units when used in connection with the transversely spaced, rear caster wheels of the implement, and which is quite elongated, prevent the rear end of such implement from drifting to the right or left when being pulled empty or on a slight grade, or if the implement is scraping more dirt on one side than the other.

An additional object of the present invention is to provide a stabilizer unit, for the purpose described, which embodies a novel spring-pressed caster wheel holding device; the latter being adjustable—selectively and independently—to set the normal or locked running position of the related caster wheel, and to predetermine the lateral pressure or side draft, upon the occurrence of which the device will release and permit of caster action of the wheel.

It is also an object of the invention to provide a stabilizer unit for caster wheels which is designed for ease and economy of manufacture, and ready installation either at the time of initial construction of the implement, or subsequently as an attachment.

Still another object of the invention is to provide a practical, reliable, and durable stabilizer unit for caster wheels, and one which will be exceedingly effective for the purpose for which it is designed.

These objects are accomplished by means of such structure and relative arrangement of parts as will fully appear by a perusal of the following sepcification and claims.

In the drawings:

Fig. 1 is a fragmentary rear end elevation of the frame of an implement, such as a finish leveler, supported by transversely spaced caster wheels; one of the stabilizer units being shown in connection with each of the wheel mounts.

Fig. 4 is an enlarged sectional elevation taken on line 4—4 of Fig. 3.

Figure 2:
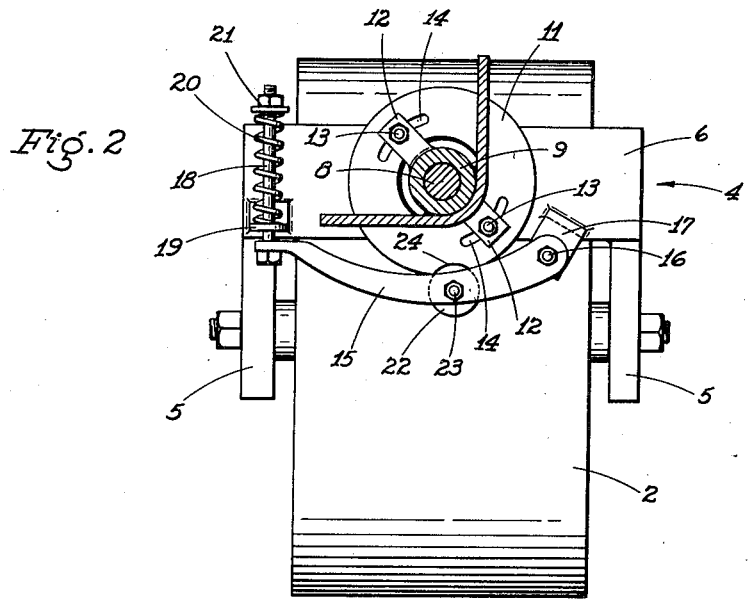
Fig. 2 is an enlarged sectional plan view taken on line 2—2 of Fig. 1; the stabilizer unit being shown with the parts in the positions occupied thereby when the caster wheel is locked in a straight-ahead running position.
Figure 3:
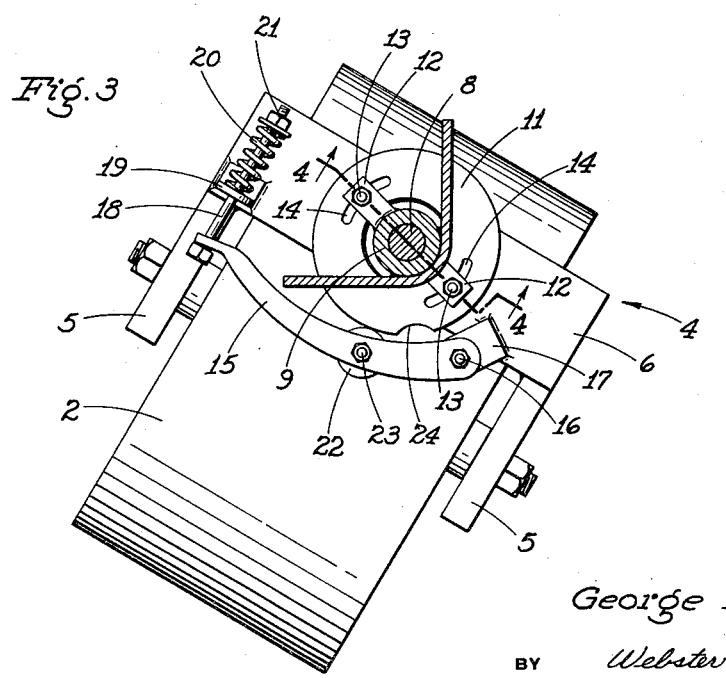
Fig. 3 is a similar view, but shows the stabilizer unit released so that the related wheel may have caster motion.

Referring now more particularly to the drawings, and to the characters of reference marked thereon, the numeral 1 indicates the rigid frame of an agricultural implement, such as the finish leveler shown in United States Letters Patent No. 2,124,625, and wherein the frame is quite elongated, being supported front and rear by pairs of transversely spaced caster wheels; the rear caster wheels being shown at 2.

The rear caster wheels 2 are mounted in connection with the related rear corners 3 of the frame 1, as follows: Each wheel 2 is carried in a heavy-duty fork, indicated generally at 4, and which fork includes depending fork legs 5 between which the wheel 2 is disposed, and to which legs said wheel is journaled, as shown.

The fork legs 5 are connected at the top by an upper cross bar 6 which includes a horizontal top plate 7.

A spindle 8 is fixed centrally to the top plate 7 and projects upwardly in turnable relation in a vertical bearing sleeve 9 rigidly attached to the corresponding rear corner 3 of the frame 1.

The spindle 8 is formed at its lower end with an enlarged hub 10 secured, as by welding, to the top plate 7; such hub abutting against the lower end of the bearing sleeve 9.

The stabilizer unit for each caster wheel assembly, as above, comprises the following:

A horizontal ring plate 11 surrounds the lower end of the sleeve 9 and is supported therefrom by means of opposed, radially outwardly projecting fingers 12 which are rigidly secured to said sleeve as by welding.

The fingers 12 overlie the horizontal ring plate 11; said fingers and the ring plate being secured together by bolts 13 which pass through arcuate slots 14 cut through said plate concentric to the axis of the spindle 8 and sleeve 9. With this arrangement the ring plate 11 is normally maintained in a fixed position, but can be rotatably adjusted, when desired, for the purpose as will hereinafter appear.

A generally transversely extending, curved, horizontally slotted arm 15 is disposed to the rear of the ring plate 11 but in closely adjacent relation thereto; such arm 15 being vertically pivoted at one end by a bolt 16 to a horizontal attachment bracket 17 fixed on and projecting rearwardly from the top plate 7.

At its opposite end, which lies laterally beyond the ring plate 11 said arm 15 is connected to the rear end of a horizontal, forwardly projecting tension rod 18.

In spaced relation ahead of the arm 15 the tension rod 18 slidably projects through an upstanding ear 19 fixed on the top plate 7; said rod extending a substantial distance ahead of said ear.

A heavy-duty compression spring 20 surrounds the tension rod 18 between the upstanding ear 19 and an adjustment nut and washer assembly 21 on the forward end portion of such rod.

With the foregoing arrangement the compression spring 20, acting through the tension rod 18, tends to forcefully urge the arm 15 in a forward direction.

The slotted arm 15 is fitted therein, intermediate its ends, with a roller 22 carried on a vertical pivot bolt 23; the roller being of such diameter that it is exposed some distance in front of the forward edge of said slotted arm 15.

At a point in the periphery thereof and adjacent the rear, the ring plate 11 is formed with an arcuate notch 24 of a size and shape to receive the roller 22 in matching engagement.

In the normal or straight-ahead running position of the related caster wheel 2, the roller 22 engages in the arcuate notch 24 under considerable pressure imparted by the arm 15 from the spring 20 and tension rod 18. The ring plate 11 is pre-set—i. e. rotatably adjusted—to so dispose the wheel. Such adjustment is of course accomplished by loosening the bolts 13 and part-circle turning the ring plate 11 until the desired setting of the notch 24 is obtained, whereupon the bolts 13 are retightened.

As long as the roller 22 remains in engagement in the arcuate notch 24, the related wheel 2 is maintained in a straight-ahead, normal running position and all caster motion is prevented; this being desirable—especially on an implement known as a finish leveler—for the reasons hereinbefore explained.

However, when the implement begins to make a turn, as at the end of a field, considerable lateral pressure or side draft is imposed on each wheel 2, and which is sufficient to cause the roller 22 to ride out of the arcuate notch 24, whereupon the wheel is capable of substantially free caster motion during completion of the turn of the implement.

After the turn is completed and each wheel 2 returns to its normal straight-ahead running position, the roller 22 re-engages in the arcuate notch 24 to thereafter lock the wheel against caster motion. It is to be recognized that during normal forward travel the lateral forces on each wheel 2 are not sufficient to disengage the stabilizer unit for such wheel.

By adjustment of the nut and washer assembly 21 to vary the compression of spring 20, it is possible to predetermine the lateral pressure or side draft which will be required on each wheel 2 before the stabilizer unit will release and permit of caster motion of such wheel.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a frame supporting caster assembly, a fork having a top plate, a wheel journaled in the fork, a vertical spindle projecting upward from the top plate, a vertical bearing sleeve adapted to be rigid with a frame, the spindle being turnably engaged in the sleeve, a ring surrounding the sleeve, the ring having a peripheral notch therein, means securing the ring to the sleeve, a horizontal arm pivoted to the top plate and extending to a point adjacent the notch, a locking element on the arm adapted to normally but releasably engage in the notch, and spring means yieldably urging the arm in a direction to cause engagement of the locking element in the notch.

2. A structure, as in claim 1, in which the notch is arcuate, and said locking element is a vertical axis roller.

3. A structure, as in claim 1, in which the ring mounting means comprises fingers fixed on the sleeve, the ring having arcuate slots therein concentric to the spindle axis, the fingers intersecting the slots and bolts projecting through the slots and connecting the ring and fingers.

4. In a frame supporting caster assembly, a fork having a top plate, a wheel journaled in the fork, a vertical spindle projecting upwardly from the top plate, a vertical bearing sleeve adapted to be rigid with a frame, the spindle being turnably engaged in the sleeve, a ring surrounding the sleeve, the ring having a peripheral notch therein, means securing the ring to the sleeve, a horizontal arm spanning adjacent the peripherally notched portion of the ring, means vertically pivoting the arm at one end on the top plate, spring means between the other end of the arm and the top plate yieldably urging the arm toward said portion of the ring, and a locking element on the arm intermediate its ends normally but releasably engaged in the notch.

5. A structure, as in claim 4, in which the notch is disposed at a point intermediate the sides of the ring; the arm pivot being outwardly of one side of the ring and said spring means being outwardly of the other side of said ring.

6. A structure, as in claim 5, in which said spring means comprises a rod attached to said other end of the arm, an ear on the top plate, the rod projecting in slidable relation through the ear, a nut threaded on the projecting end of the rod, annd a compression spring on the rod between the ear and nut.

References Cited in the file of this patent

UNITED STATES PATENTS

| | | |
|---|---|---|
| 862,267 | Meyer | Aug. 6, 1907 |
| 1,752,183 | Kell | Mar. 25, 1930 |
| 2,480,524 | Vallone et al. | Aug. 30, 1949 |
| 2,560,726 | Jones et al. | July 17, 1951 |
| 2,634,986 | McDaniel | Apr. 14, 1953 |